US005352548A

United States Patent [19]
Fujimoto et al.

[11] Patent Number: 5,352,548
[45] Date of Patent: Oct. 4, 1994

[54] SECONDARY BATTERY

[75] Inventors: Masahisa Fujimoto; Masatoshi Takahashi; Koji Nishio, all of Osaka, Japan

[73] Assignee: Sanyo Electric Co., Ltd., Osaka, Japan

[21] Appl. No.: 85,631

[22] Filed: Jun. 30, 1993

[30] Foreign Application Priority Data

Jul. 27, 1992 [JP] Japan .................. 4-220732

[51] Int. Cl.$^5$ .................. H01M 6/16; H01M 4/58
[52] U.S. Cl. .................. 429/197; 429/194; 429/218
[58] Field of Search .................. 429/197, 194, 218

[56] References Cited

U.S. PATENT DOCUMENTS

| | | |
|---|---|---|
| H1,076 | 7/1992 | Slane et al. |
| 3,871,915 | 3/1975 | Brych .................. 429/196 |
| 5,169,736 | 12/1992 | Bittian et al. .................. 429/197 X |

FOREIGN PATENT DOCUMENTS

| | | |
|---|---|---|
| 0205856 | 12/1986 | European Pat. Off. |
| 04082287 | 4/1992 | European Pat. Off. |
| 0490048 | 6/1992 | European Pat. Off. |
| 0548449 | 6/1993 | European Pat. Off. |
| 2204899 | 5/1974 | France . |
| 4095362 | 3/1992 | Japan . |
| 4169075 | 6/1992 | Japan . |

Primary Examiner—John S. Maples
Attorney, Agent, or Firm—Spensley Horn Jubas & Lubitz

[57] ABSTRACT

A secondary battery is comprised of a positive electrode, a negative electrode formed from a carbon composition intercalating lithium reversibly and a non-aqueous electrolyte. The non-aqueous electrolyte includes a lithium salt and a mixture of a low boiling point solvent having the boiling point of 150° C. or lower and an organic solvent of vinylene carbonate or its derivative. The negative electrode may comprise a graphite, and the positive electrode may comprise a material being selected from a group consisting of metal chalcogen and metal oxide, such as $V_2O_5$, $TiS_2$, $MoS_2$, $LiCoO_2$, $LiMnO_2$, $LiNiO_2$, $LiCrO_2$, $LiMn_2O_4$ and $LiFeO_2$. The low boiling point solvent may be selected from a group consisting of dimethyl carbonate, diethyl carbonate, 1,2-dimethoxy ethane, 1,2-diethoxy ethane and ethoxymethoxy ethane. The derivative may be provided by replacing at least one of two hydrogen atoms of the vinylene carbonate with one selected from a group consisting of a methyl group, an ethyl group and one halogen atom.

7 Claims, 2 Drawing Sheets

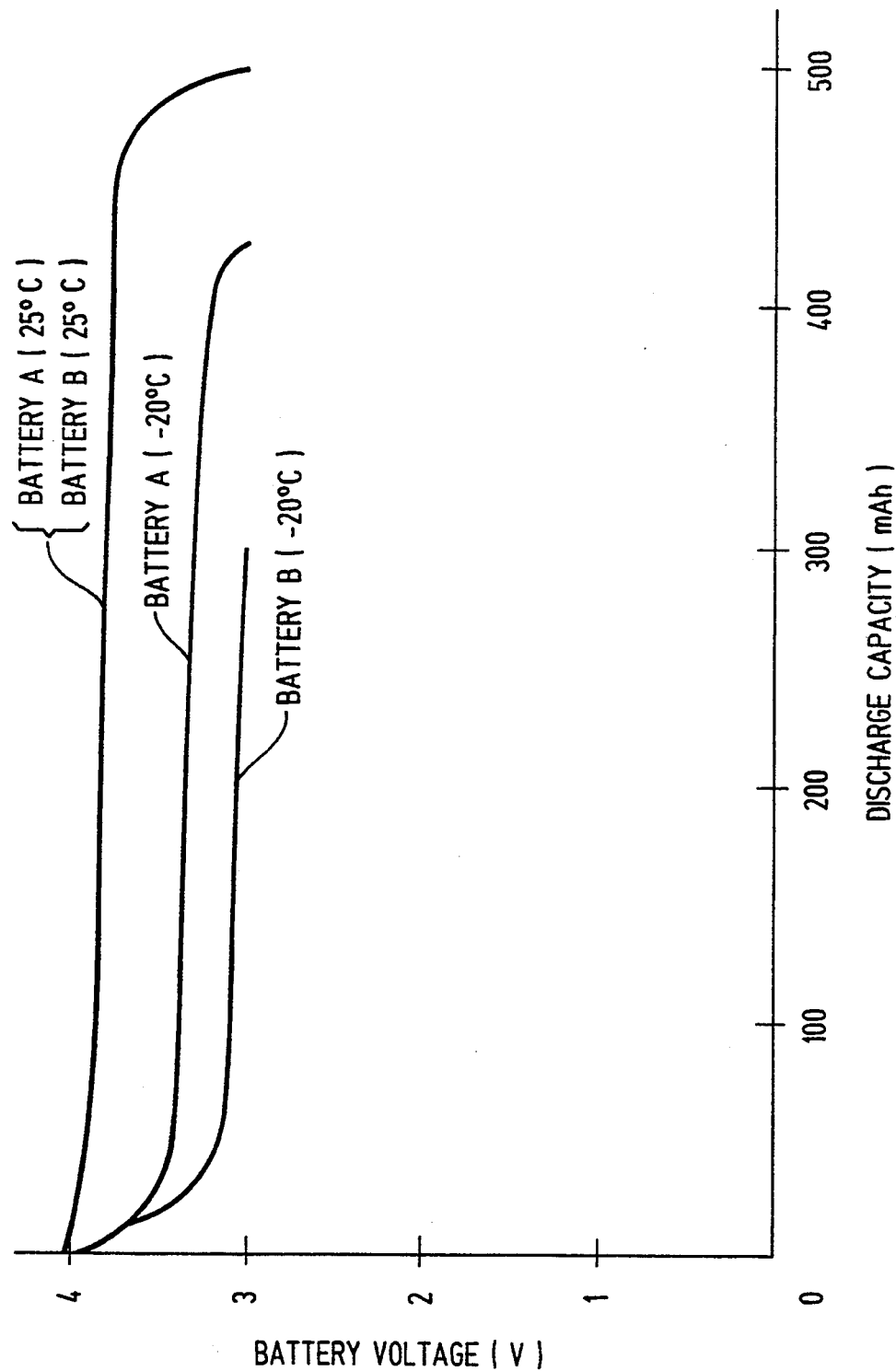

5,352,548

SECONDARY BATTERY

BACKGROUND OF THE INVENTION

1. Field of the Invention

This invention relates to a secondary battery using lithium, as an active material, and more particularly to an improvement of an electrolyte to be used in a secondary battery.

2. Description of the Prior Art

Currently, carbon compositions, including graphite, coke and the like, are tested as materials for use as a negative electrode in a secondary battery using lithium. It is appreciated that the carbon compositions have a superior reversibility in charge and discharge cycles and substantially prevent mossy lithium from electrically depositing on a surface of the negative electrode. In particular, graphite has a high lithium intercalating-/deintercalating capacity and therefore is considered to be one of the most useful carbon compositions as a negative electrode material. The use of graphite as a negative electrode material, however, presents a problem when graphite is used in propylene carbonate or butylene carbonate because graphite has many active spots in its structure as compared with coke. Propylene carbonate and butylene carbonate are known as solvents to be used in an electrolyte which may be easily decomposed. Therefore, if a graphite negative electrode is used in an electrolyte containing propylene carbonate or butylene carbonate as a solvent, the solvent is adsorbed onto the active spots of the graphite negative electrode and readily generate gas through decomposition. As a result, the decomposition of the solvent prevents lithium ion as an active material from intercalating into the graphite on charging the battery, and causes an increase in polarization as a result of a gas overvoltage. Consequently, a battery capacity is decreased.

Such a problem may be solved by using ethylene carbonate as a solvent, which is not easily decomposed as compared with propylene carbonate. In particular, a mixed solvent of ethylene carbonate and a low boiling point solvent having the boiling point of 150° C. or lower has excellent characteristics as an electrolyte solvent to be used in a lithium secondary battery.

However, the above electrolyte including ethylene carbonate has a relatively high solidifying point. Therefore, its ion conductivity is not sufficient in a low temperature range. For example, the above phenomenon is observed when an electrolyte includes a mixed solvent of dimethyl carbonate and ethylene carbonate. Dimethyl carbonate is a low boiling point solvent and ethylene carbonate has a solidifying point (melting point) of about 39° C.–40° C. When they are mixed, the electrolyte may have a solidifying point of about −20° C. As a result, batteries equipped with the aforementioned electrolyte have an extremely reduced battery capacity when discharging at a low temperature of −20° C. or lower.

SUMMARY OF THE INVENTION

Accordingly, a primary object of an embodiment of the present invention is to provide a secondary battery which substantially prevents discharge capacity from reducing at a low temperature of −20° C. or lower.

Another object of an embodiment of the present invention is to provide a secondary battery with improved battery characteristics, such as improved discharge capacity at a low temperature.

The above objects are fulfilled by an embodiment of a secondary battery comprising a positive electrode, a negative electrode having a carbon composition intercalating lithium reversibly and a non-aqueous electrolyte. The non-aqueous electrolyte includes a lithium salt and a mixture of at least a low boiling point solvent having the boiling point of 150° C. or lower and an organic solvent defined by one of vinylene carbonate and its derivative.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings:

FIG. 2 is a graph showing the relationship between discharge capacity and battery voltage of an embodiment of the present invention.

DETAILED DESCRIPTION OF THE PREFERRED EMBODIMENT

Figure 1:
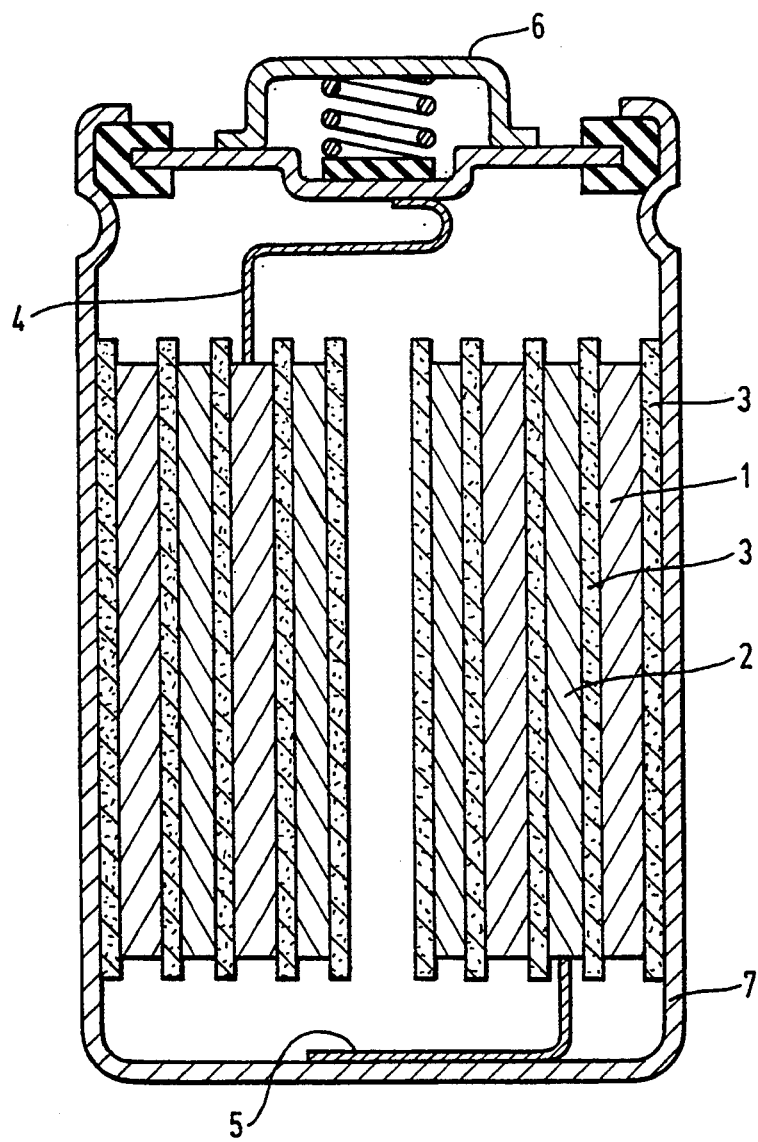
FIG. 1 is a cross-sectional view of a secondary battery in accordance with an embodiment of the present invention.

The following detailed description is believed to be of the best presently contemplated mode of carrying out the invention. This description is not to be taken in a limiting sense, but is made merely for the purpose of illustrating general principles of embodiments of the invention. The scope of the invention is best defined by the appended claims.

In an embodiment of the present invention, a carbon composition for a negative electrode which intercalates lithium reversibly may be formed, for example, by coke, preferably, refined coke with the purity of 99% or more, organic compounds produced by calcined cellulose, graphite or grassy carbon. It is appreciated that these carbon compositions have a porous structure. In accordance with the requirement, they may be used independently, or two or more of them may be mixed together. Graphite may be one of the most suitable materials for the negative electrode because of its large lithium intercalating and deintercalating capacity as an active material.

The carbon composition is mixed with a binder, such as for example, polytetrafluoroethylene (PTFE) and polyvinylidenfluoride (PVDF) to obtain a mixture for a negative electrode.

In one aspect of the present invention, an electrolyte includes a mixture of organic solvents. In accordance with one embodiment of the present invention, the mixture is composed of a low boiling point solvent (with low viscosity) having the boiling point of 150° C. or lower and an organic solvent. In one embodiment, the organic solvent includes vinylene carbonate and its derivatives. A vinylene carbonate derivative may be obtained by replacing at least one of hydrogen atoms of vinylene carbonate by a methyl group, an ethyl group or one halogen atom. It is noted that vinylene carbonate and its derivatives have substantially low solidifying temperature as compared with that of ethylene carbonate.

The low boiling point solvent having the boiling point of 150° C. or lower may be selected from dimethyl carbonate, diethyl carbonate, 1,2-dimethoxy ethane, 1,2-diethoxy ethane, ethoxymethoxy ethane or a mixture of at least two of them. Preferably, a mixture solvent may include vinylene carbonate and dimethyl carbonate. Such a mixture solvent is found to have a low solidifying point and a high ion conductivity at a low temperature. As a result, a lithium secondary battery using the mixture solvent of vinylene carbonate and dimethyl carbonate has superior low temperature characteristics in which deterioration of the battery capacity is substantially prevented in a low temperature range.

As noted above, a mixture solvent in accordance with a preferred embodiment includes vinylene carbonate or its derivative having the low solidifying point as compared with that of ethylene carbonate. It should be noted that vinylene carbonate is as hard to decompose as ethylene carbonate, and therefore, generates less gas as a result of the decomposition of the solvent than, for example, propylene carbonate does. As a result, deterioration of the battery capacity is substantially prevented.

In accordance with a preferred embodiment of the present invention, a mixture of organic solvents may include about 20 volume %–80 volume % of vinylene carbonate or its derivative. It has been found that such a mixing rate causes less reduction in discharge capacity in high rate current.

In one embodiment of the present invention, a suitable lithium salt for the non-aqueous electrolyte may be selected from various fluorides, such as for example, $LiPF_6$, $LiBF_4$, $LiCF_3SO_3$, $LiAsF_6$, $LiSbF_6$, $LiC(CF_3SO_2)_3$, $LiN(CF_3SO_2)_2$. It should be appreciated that two or more of them may be mixed to obtain a lithium salt.

Various compound materials may be used for the positive electrode which are capable of intercalating and deintercalating lithium ion. For example, inorganic compounds, such as, metal oxide with tunnel-like porous holes ($TiO_2$, $V_2O_5$ or the like) or metal chalcogen in layered structure ($TiS_2$, $MoS_2$ or the like) may be used. It has been found that a double oxide having a formula of $Li_xMO_2$ or $Li_yM_2O_4$ is also preferable as material for the positive electrode. In the formulas, "M" represents at least one of transition elements, "x" represents a value between "0" and "1" and "y" represents a value between "0" and "2". These double oxide may include $LiCoO_2$, $LiMnO_2$, $LiNiO_2$, $LiCrO_2$, $LiMn_2O_4$ or $LiFeO_2$. Further, a conductive polymer such as polyaniline, or a doped conductive polymer which is doped with anion of porphyrin may be available for the positive electrode. The materials for the positive electrode are mixed with a binder and a conductive agent to obtain a mixture. The conductive agent may include acetylene black and carbon black. The binder may include polytetrafluoroethylene (PTFE) and polyvinylidenfluoride (PVDF).

EMBODIMENT

{A secondary battery "A" of the present invention}

A method of preparing a positive electrode is described below. $LiCoO_2$ is mixed with acetylene black as a conductive agent and polytetrafluoroethylene (PTFE) as a binder, in a weight ratio of 90:6:4 to obtain a mixture. The mixture is kneaded and then pressed onto a conductive plate of thin aluminum foil to obtain an electrode plate. The electrode plate is then heat-treated at 250° C. for 2 hours under a vacuum condition, to provide a positive electrode.

A negative electrode is prepared in a manner described below. Natural graphite is mixed with a PTFE as a binder in a ratio of 95:5 to obtain a mixture. The mixture is pressed onto a current collector comprising a thin copper plate to obtain an electrode plate. The electrode plate is heated under a vacuum condition at 250° C. for 2 hours to provide a negative electrode.

Vinylene carbonate and dimethyl carbonate (a low boiling point solvent) are mixed to form an organic solvent mixture. A lithium salt ($LiPF_6$) is dissolved into the solvent mixture in a concentration of 1 mole/liter to provide a non-aqueous electrolyte. In the electrolyte, a volume ratio of vinylene carbonate to dimethyl carbonate is preferably set at 1:1.

As shown in FIG. 1, the battery "A" of the present invention has a positive electrode 1 and a negative electrode 2. These electrodes 1 and 2 are separated by a separator 3 impregnated with non-aqueous electrolyte. The separator 3 is typically formed from an ion permeative porous polypropylene thin film (for example, "Cellgard 3401", made by Hoechst Celanese Co. Ltd.). The positive electrode 1, the negative electrode 2 and the separator 3 are coiled into a roll, and the roll is placed in an outer case 7. The positive electrode 1 is connected to a positive terminal 6 through a lead plate 4. The negative electrode 2 is connected to the outer case 7 through a lead plate 5. The battery "A" typically has a cylindrical shape. In a preferred embodiment, the diameter and the height of the battery "A" are 14.22 mm and 50 mm, respectively.

{A secondary battery "B" as a comparative example}

A battery "B" uses a mixture of organic solvents of ethylene carbonate and dimethyl carbonate and a lithium salt ($LiPF_6$), as a non-aqueous electrolyte. The lithium salt ($LiPF_6$) is dissolved in a concentration by 1 mole/liter. A volume ratio of ethylene carbonate to dimethyl carbonate is set at 1:1. Other elements are prepared in the same manner as the battery "A".

COMPARISON OF A DISCHARGE CAPACITY

Cycle characteristics of the above described batteries "A" and "B" are tested. In the test, the batteries are charged to a charge stopping voltage of 4.1 V at a charging current of 200 mA at two different temperatures, a room temperature of 25° C. and a low temperature of −20° C. The batteries are then discharged to a discharge stopping voltage of 3.0 V at a discharge current of 200 mA to complete 1 cycle. This cycle is repeated. FIG. 2 shows discharge characteristics of the batteries tested. In FIG. 2, the horizontal axis represents capacity (mAh) of the batteries and the vertical axis represents battery discharge voltage (V).

According to FIG. 2, at room temperature, there is not a substantial difference in the discharge capacity between the batteries "A" and "B". In contrast, while the battery "A" of the present invention has the discharge capacity of 425 mAh at the low temperature of −20° C., the battery "B" of the comparative example merely has the discharge capacity of 300 mAh. It is clear from this result that the battery "A" is prevented from reducing the capacity under the low temperature environment as compared to that of the battery "B".

In the above described embodiments, the batteries have a cylindrical shape. However, it should be appreciated that a coin shaped battery or a flat shaped battery are similarly available.

While the description above refers to particular embodiments of the present invention, it will be understood that many modifications may be made without departing from the spirit thereof. The accompanying claims are intended to cover such modifications as would fall within the true scope and spirit of the patent invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A secondary battery, comprising:
   a positive electrode;
   a negative electrode having a carbon composition intercalating lithium reversibly, said negative electrode comprising a graphite; and
   a non-aqueous electrolyte including a lithium salt and a mixture of at least a low boiling point solvent having a boiling point of 150° C. or lower and an organic solvent defined by one of vinylene carbonate and a derivative provided by replacing at least one of two hydrogen atoms of said vinylene carbonate with one selected from a group consisting of a methyl group, an ethyl group and one halogen atom, wherein said low boiling point solvent is selected from a group consisting of dimethyl carbonate, diethyl carbonate, 1,2-dimethoxy ethane, 1,2-diethoxyethane and ethoxymethoxy ethane.

2. A secondary battery according to claim 1, wherein said positive electrode comprises a material being selected from a group consisting of metal chalcogen and metal oxide.

3. A secondary battery according to claim 2, wherein said material is selected from a group consisting of $TiO_2$, $V_2O_5$, $TiS_2$, $MoS_2$, $LiCoO_2$, $LiMnO_2$, $LiNiO_2$, $LiCrO_2$, $LiMn_2O_4$ and $LiFeO_2$.

4. A secondary battery, comprising:
   a positive electrode having one of metal chalcogen and metal oxide selected from a group consisting of $TiO_2$, $V_2O_5$, $TiS_2$, $MoS_2$, $LiCoO_2$, $LiMnO_2$, $LiNiO_2$, $LiCrO_2$, $LiMn_2O_4$ and $LiFeO_2$;
   a negative electrode comprising a graphite intercalating lithium reversibly; and
   a non-aqueous electrolyte including a lithium salt and a mixture of at least a low boiling point solvent having a boiling point of 150° C. or lower and an organic solvent defined by one of vinylene carbonate and a derivative provided by replacing at least one of two hydrogen atoms of said vinylene carbonate with one selected from a group consisting of a methyl group, an ethyl group and one halogen atom of said vinylene carbonate, wherein said mixture includes 20 volume %–80 volume % of said vinylene carbonate or said derivative, and said low boiling point solvent is selected from a group consisting of dimethyl carbonate, diethyl carbonate, 1,2-dimethoxy ethane, 1,2-diethoxy ethane and ethoxymethoxy ethane.

5. A secondary battery, comprising:
   a positive electrode having one of metal chalcogen and metal oxide;
   a negative electrode essentially consisting of a graphite intercalating lithium reversibly; and
   a non-aqueous electrolyte including a lithium salt and a mixture of at least two organic solvents, wherein said mixture is composed of a low boiling point solvent having a boiling point of 150° C. or lower and an organic solvent defined by one of vinylene carbonate and a derivative provided by replacing at least one of two hydrogen atoms of said vinylene carbonate with one selected from a group consisting of a methyl group, an ethyl group and one halogen atom, wherein said mixture includes 20 volume %–80 volume % of said vinylene carbonate or said derivative.

6. A secondary battery, according to claim 5, wherein said positive electrode includes a material selected from a group consisting of $TiO_2$, $V_2O_5$, $TiS_2$, $MoS_2$, $LiCoO_2$, $LiMnO_2$, $LiNiO_2$, $LiCrO_2$, $LiMn_2O_4$ and $LiFeO_2$.

7. A non-aqueous electrolyte according to claim 5, wherein said low boiling point solvent is a solvent selected from a group consisting of dimethyl carbonate, diethyl carbonate, 1,2-dimethoxy ethane, 1,2-diethoxy ethane and ethoxymethoxy ethane.

* * * * *